(12) United States Patent  (10) Patent No.: US 7,523,798 B2
Muramatsu et al.  (45) Date of Patent: Apr. 28, 2009

(54) SUPPORT STRUCTURE OF COOLING AIR INTAKE DUCT FOR INTERCOOLER OF VEHICLE

(75) Inventors: Takaaki Muramatsu, Hiroshima (JP); Takashi Kadowaki, Hiroshima (JP); Noriaki Fujita, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 459 days.

(21) Appl. No.: 11/195,735

(22) Filed: Aug. 3, 2005

(65) Prior Publication Data

US 2006/0086548 A1 Apr. 27, 2006

(30) Foreign Application Priority Data

Oct. 8, 2004 (JP) ............................. 2004-295725

(51) Int. Cl.
*B60K 11/00* (2006.01)
(52) U.S. Cl. ................. 180/68.1; 180/68.2; 180/68.3; 180/68.4
(58) Field of Classification Search ................ 180/68.1, 180/68.2–68.6
See application file for complete search history.

(56) References Cited

U.S. PATENT DOCUMENTS

| 4,566,407 A | * | 1/1986 | Peter ........................ 123/41.48 |
| 4,690,204 A | | 9/1987 | Reichel et al. |
| 4,831,981 A | * | 5/1989 | Kitano .................... 123/198 E |
| 5,243,933 A | | 9/1993 | Mukawa |
| 2003/0201133 A1 | * | 10/2003 | Kobayashi et al. .......... 180/291 |

FOREIGN PATENT DOCUMENTS

| EP | 1 155 931 A2 | 11/2001 |
| EP | 1 155 931 A3 | 11/2001 |
| JP | 2-220978 | 9/1990 |
| JP | 02220978 A * | 9/1990 |
| JP | 03011118 A * | 1/1991 |
| JP | 2001039171 A * | 2/2001 |
| JP | 2003-335173 | 11/2003 |
| JP | 2004-124757 | 4/2004 |
| JP | 2004-231075 | 8/2004 |
| WO | WO 2005/075236 A1 | 8/2005 |

OTHER PUBLICATIONS

European Search Report dated Dec. 12, 2005.

* cited by examiner

*Primary Examiner*—Christopher P Ellis
*Assistant Examiner*—Katy Meyer
(74) *Attorney, Agent, or Firm*—Studebaker & Brackett PC; Donald R. Studebaker (57) ABSTRACT

The duct comprises the upper member and the lower member, which are formed separately and assembled integrally by being attached to one another. There is provided the seal member to interconnect the opening at the lower member and the intercooler, which is pressed against the upper face of the intercooler. The front side of the lower member is supported at the shroud panel, and the rear side of the upper panel is supported at the cowl panel. Thus, the rear attachment portion is detached earlier than the front attachment portion at the pedestrian's hit. Accordingly, the duct can be split surely and the engine hood can be allowed to be properly deformed without being prevented, so that the protection of the head of pedestrians can be attained properly.

6 Claims, 10 Drawing Sheets

SUPPORT STRUCTURE OF COOLING AIR INTAKE DUCT FOR INTERCOOLER OF VEHICLE

BACKGROUND OF THE INVENTION

The present invention relates to a support structure of cooling air intake duct for intercooler of a vehicle with an engine equipped with a supercharger.

Conventionally, vehicle designing for improving a roomy passenger compartment has been developed, and therefore there is a tendency of a relatively short engine room in a longitudinal direction of the vehicle. This tendency influences not only an engine installment but also layouts of an air cleaner, a battery and other components to some extent. Particularly, in the vehicle with the supercharged engine, it is necessary to provide a space for disposing an intercooler.

Herein, the layout structure in which the intercooler of the vehicle is disposed in a flat position above the engine is known as disclosed in Japanese Patent Laid-Open Publication No. 2003-335173. In this structure, it will be necessary to provide a cooling air intake duct for intercooler which includes an air inlet at its front end and an outlet connected to the intercooler at its rear end.

Meanwhile, in these days, it becomes necessary from viewpoints of the protection of pedestrians that the engine hood can be deformed properly in order to reduce an impact load which the head of pedestrians receives. Also, the engine hood tends to be designed in a low position from viewpoints of vehicle frontal design. Therefore, since the distance between the intercooler and the engine hood becomes shorter, the conventional support structures of cooling air intake duct for intercooler of the vehicle have a problem that particularly a side wall of the box-shaped duct above the intercooler would not be deformed properly. As a result, the engine hood would not be also deformed properly, and thereby the proper protection of the head of pedestrians would not be attained.

SUMMARY OF THE INVENTION

The present invention has been devised in view of the above-described problem, and an object of the present invention is to allow the engine hood to be properly deformed-without being prevented by the duct, thereby attaining the proper protection of the head of pedestrians.

According to the present invention, there is provided a support structure of cooling air intake duct for intercooler of a vehicle, comprising an intercooler disposed in a substantially flat position above an engine in an engine room, and a duct of cooling air intake for the intercooler, the duct extending toward the front of the vehicle, wherein the duct is made of resin and comprises an upper member and a lower member, which are formed separately and assembled integrally by being attached to one another, the lower member includes an opening which is formed at a lower face thereof at the rear, there is provided a seal member to interconnect the opening of the lower member and the intercooler which is pressed against an upper face of the intercooler, and the duct is supported at a vehicle body at a front support portion which is formed at the lower member thereof and at a rear support portion which is formed at the upper member thereof.

When the pedestrian hits against the engine hood, the engine hood is deformed downward and thereby the duct located above the intercooler is deformed downward. Herein, according to the present invention, the front of the lower member is supported at the vehicle body and the rear of the upper member is supported at the vehicle body, while the rear lower face of the lower member has the seal member which is just pressed against the intercooler. Therefore, the impact load of the pedestrian hitting against the engine hood is transmitted to the duct so as to function to bend the duct supported at these front and rear support points. And, the upper member pushes the lower member, and thereby on the front attachment portion of the duct between the upper and lower members acts a compressing load which is constituted of a downward force from the upper member and an upward reaction force from the lower member. Meanwhile, on the rear attachment point of the duct acts a tension load which is constituted of an upward reaction force from the upper member and a downward force from the lower member. Thereby, the rear attachment portion of the duct is detached earlier than the front attachment portion of the duct by the crash load applied to the engine hood, so that the duct is split off, from the rear toward the front, into the upper member and the lower member. Accordingly, the engine hood is allowed to be properly deformed without being prevented by the duct, so that the protection of the head of pedestrians can be attained properly.

According to an embodiment of the present invention, the duct includes an air passage which is formed therein in a laterally-long flat shape.

Accordingly, a proper volume of the air passage can be provided in the duct.

According to another embodiment of the present invention, the front support portion of the lower member is supported at a shroud panel of the vehicle, and the rear support portion of the upper member is supported at a cowl panel of the vehicle.

Accordingly, since the lower and upper members are supported on both end sides of a vehicle body in the longitudinal direction of the vehicle, the duct can be split to a large extent over the engine hood covering the intercooler at the pedestrian's hit. Thereby, the protection of the head of pedestrians can be attained surely.

According to another embodiment of the present invention, the attachment of the upper member and the lower member is constituted such that strength of the attachment on a rear side of the members is smaller than that of the attachment on a front side of the members.

Accordingly, since there exists a difference in the attachment strength between the front side and the rear side of the members, the detachment on the rear side can be promoted and thereby the split of the duct can be attained properly. Thus, the protection of the head of pedestrians can be attained more effectively.

According to another embodiment of the present invention, the attachment of the upper member and the lower member comprises a plurality of pins which are provided at one of the members so as to project toward the other member, a plurality of through holes which are formed at the other member and into which the pins are inserted, and a plurality of enlarged head portions which are formed of tips of the pins which are melted and pressed to be collapsed after the pins have been inserted into the through holes, and the pins are constituted such that a diameter size of the pins located near the rear support portion is smaller than that of the pins located near the front support portion.

When the duct is installed, the pins provided at the attachment portion of the resin-made upper member are inserted into the through holes formed at the lower member, and then melted and pressed to be collapsed. Thus, the enlarged portions are formed, and the upper and lower members are fixed by these enlarged portions. Also, the sealing function between the upper and lower members is improved by the flange provided at the lower member. Further, since the diameter size of the rear pins of the upper member is smaller than that of the front pins, the rear pins are broken earlier than the front pins by the crash load applied to the engine hood, so that the duct can be split off effectively from the rear pins. Thus, the protection of the head of pedestrians can be attained further surely.

Other features, aspects, and advantages of the present invention will become apparent from the following description which refers to the accompanying drawings.

DETAILED DESCRIPTION OF THE INVENTION

Hereinafter, embodiments of the present invention will be described referring to the accompanying drawings. Herein, the following discloses essentially preferred embodiments, which should not limit the present invention in a scope of its application or use.

Figure 1:
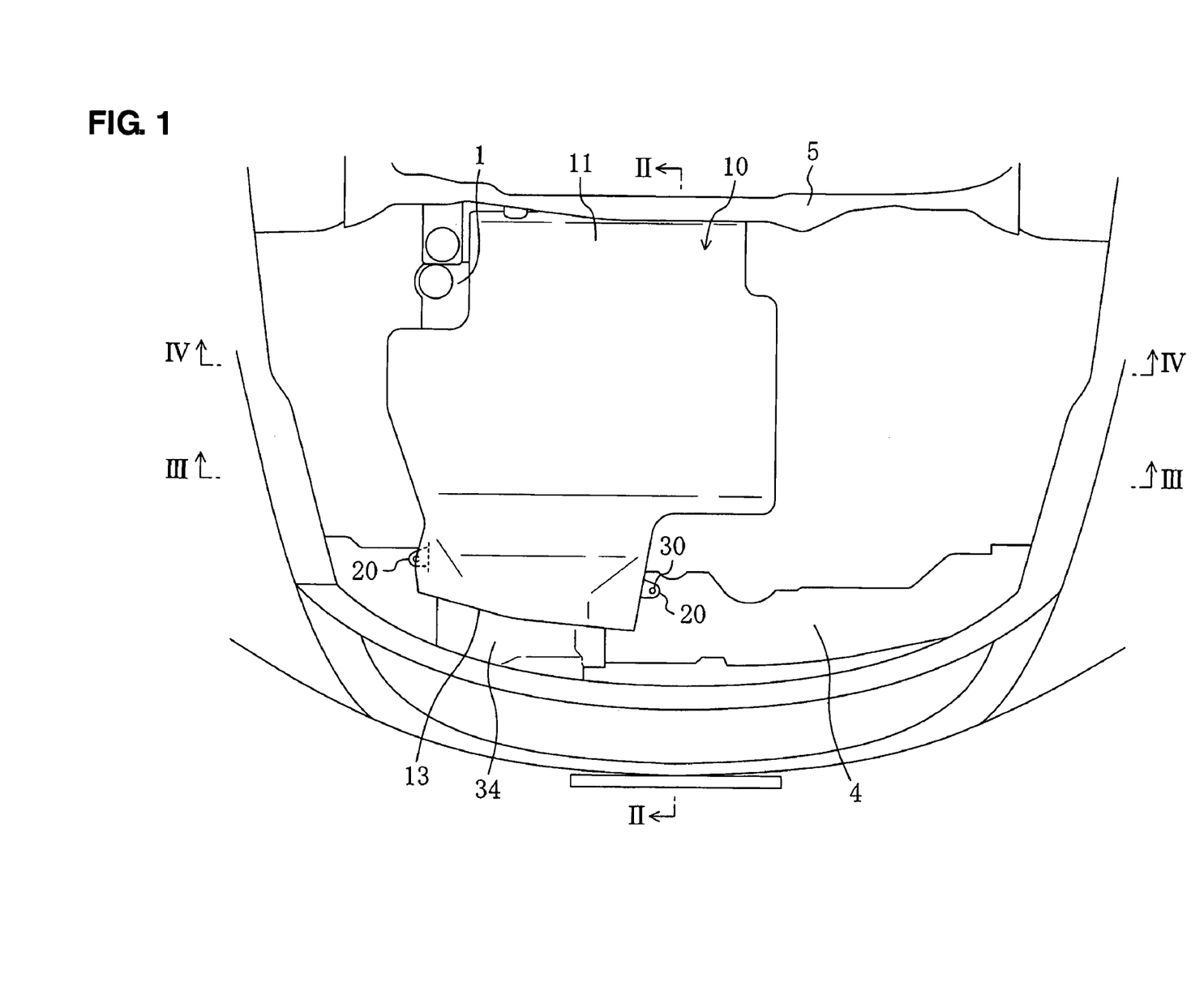
FIG. 1 is a plan view illustrating an engine room of a vehicle equipped with a support structure of cooling air intake duct for intercooler of the vehicle, except an engine hood.
Figure 2:
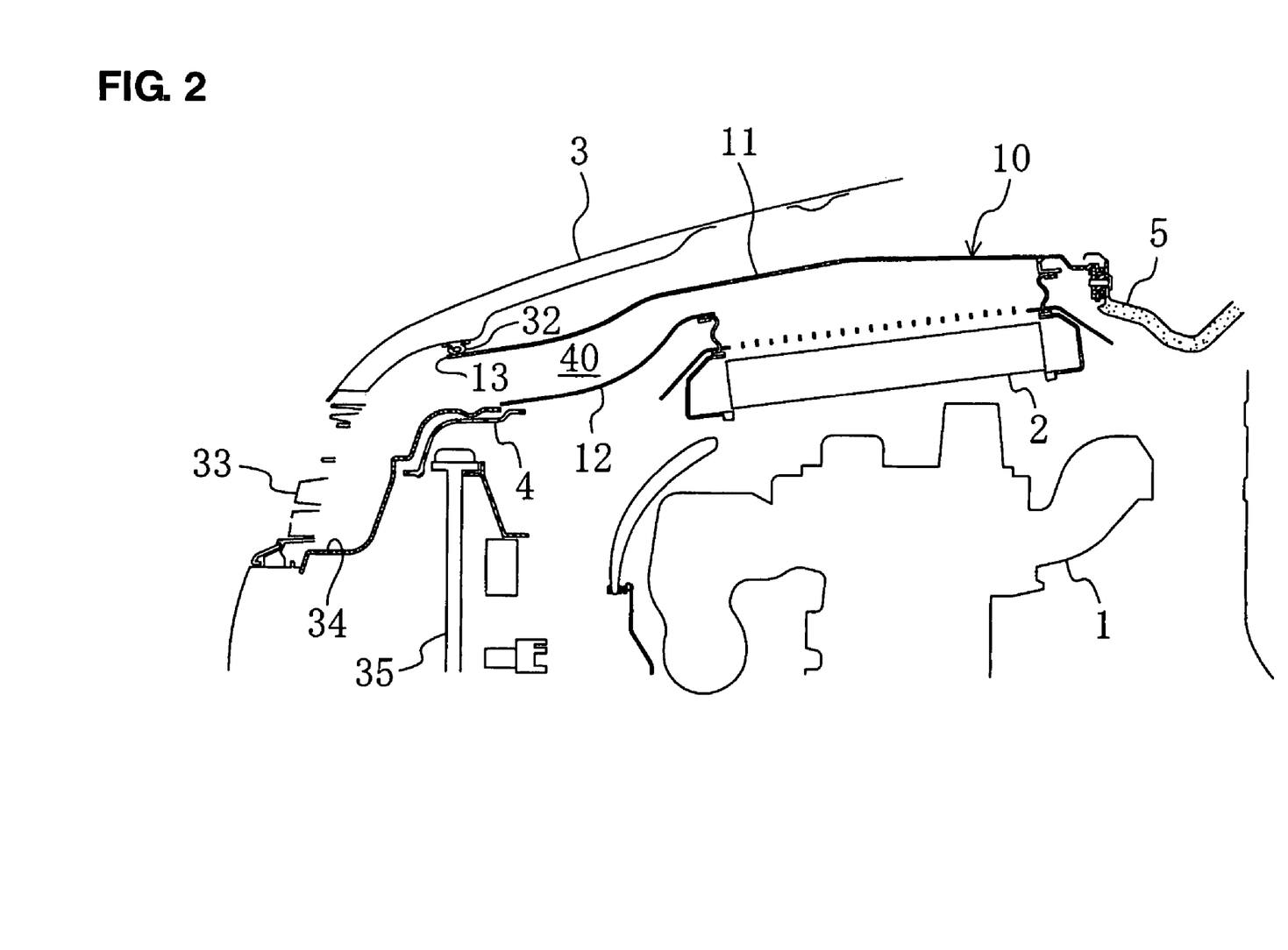
FIG. 2 is a sectional view taken along line II-II of FIG. 1.

FIGS. 1 and 2 illustrate an engine room of a vehicle equipped with a support structure of cooling air intake duct for intercooler according to an embodiment of the present invention. In this engine room is provided an engine 1 equipped with a supercharger, which is disposed so as to extend in a lateral direction of the vehicle. An intercooler 2, which is made from metal, is disposed in a substantially flat position above the engine, specifically in such a manner that its rear is located slightly above its front. Herein, an engine hood 3 to cover the engine room is not illustrated in FIG. 1.

Figure 3:
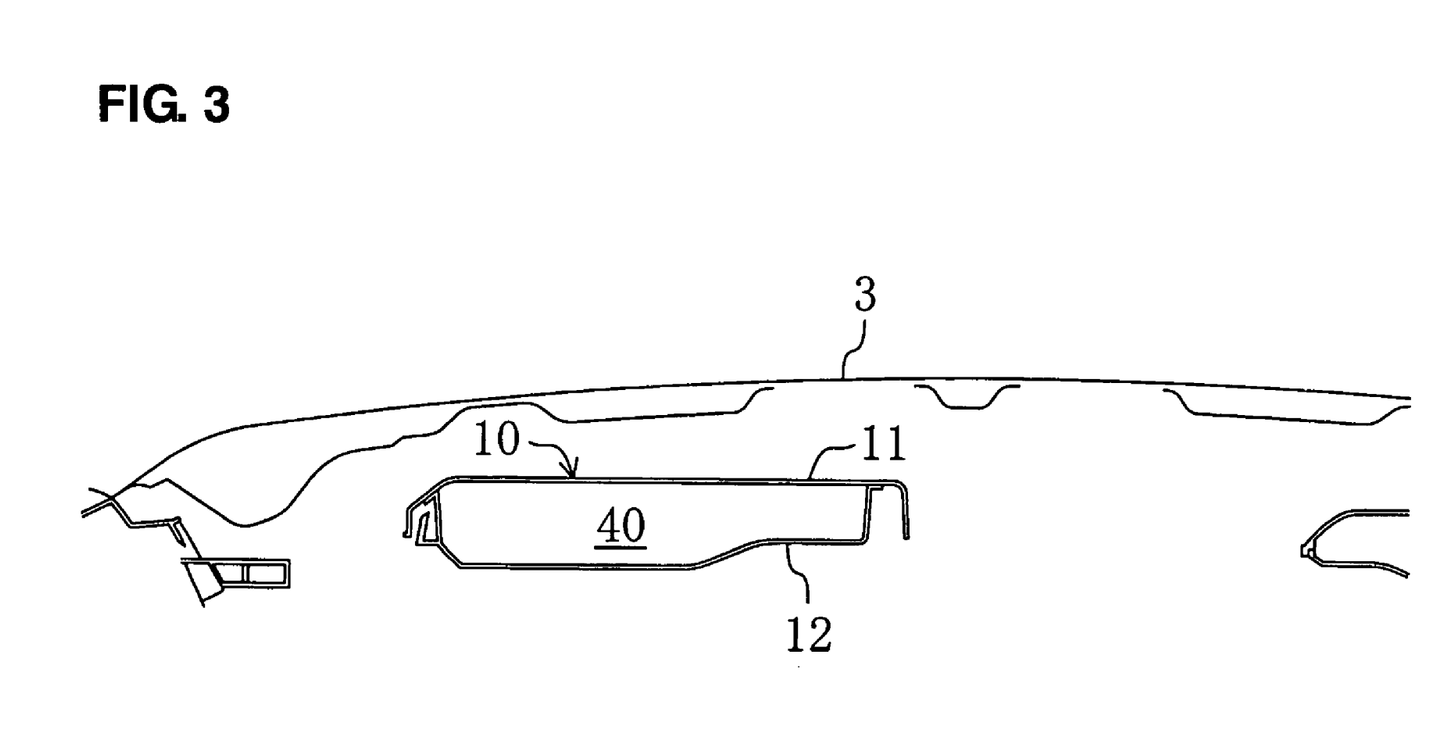
FIG. 3 is a sectional view taken along line III-III of FIG. 1.
Figure 4:
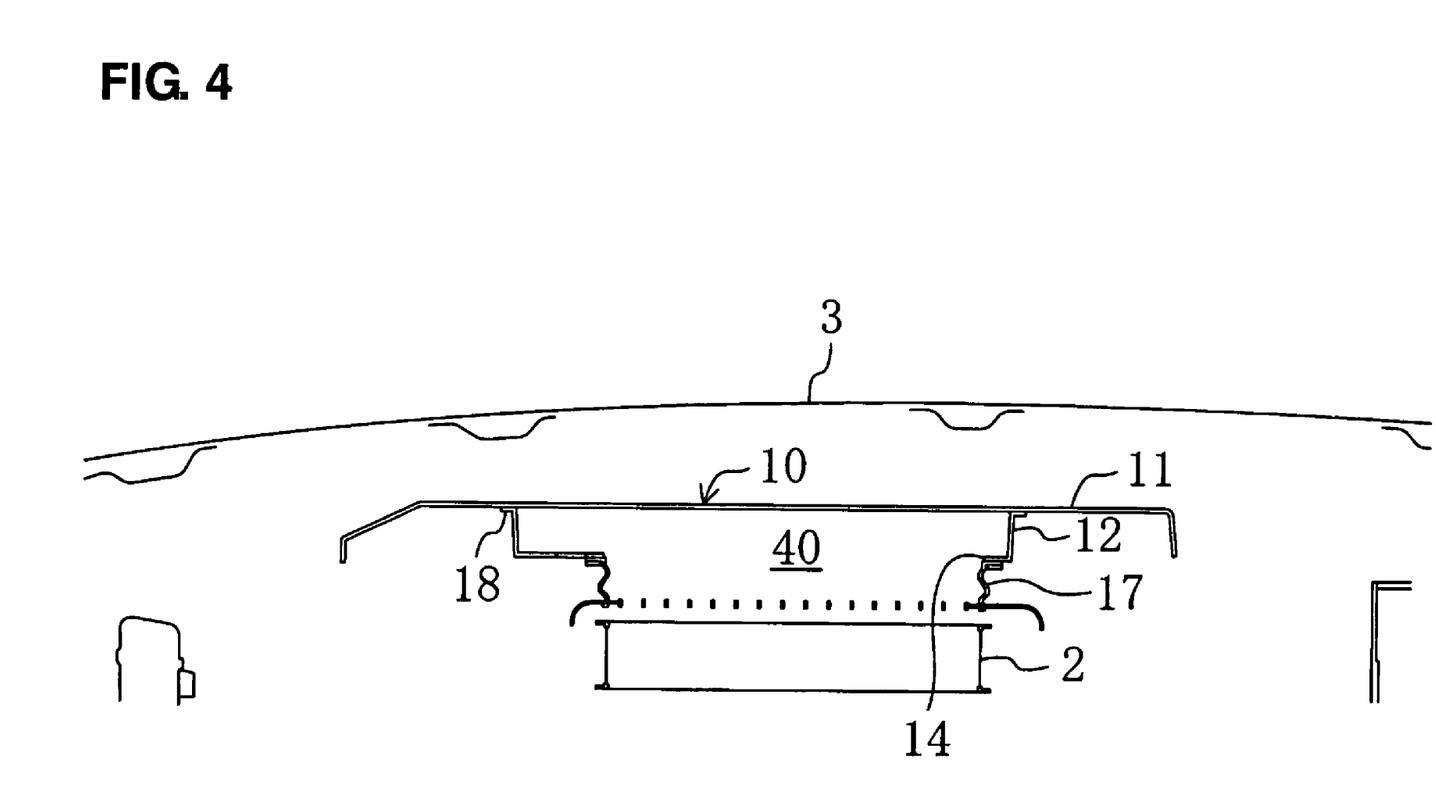
FIG. 4 is a sectional view taken along line IV-IV of FIG. 1.

As illustrated in FIGS. 3 and 4, there is provided a duct 10, as a cooling air intake duct for intercooler, above an upper face of the intercooler 2. The duct 10 is provided so as to extend toward the front of the vehicle, and it is comprised of a resin-made flat-shaped member. The duct 10 comprises an upper member 11 and a lower member 12, which are formed separately, and includes an air passage 40 therein which is formed by these members 11, 12, which are assembled integrally by being attached to one another. And, a laterally-long inlet 13 is formed at the front of the duct 10.

Figure 5:
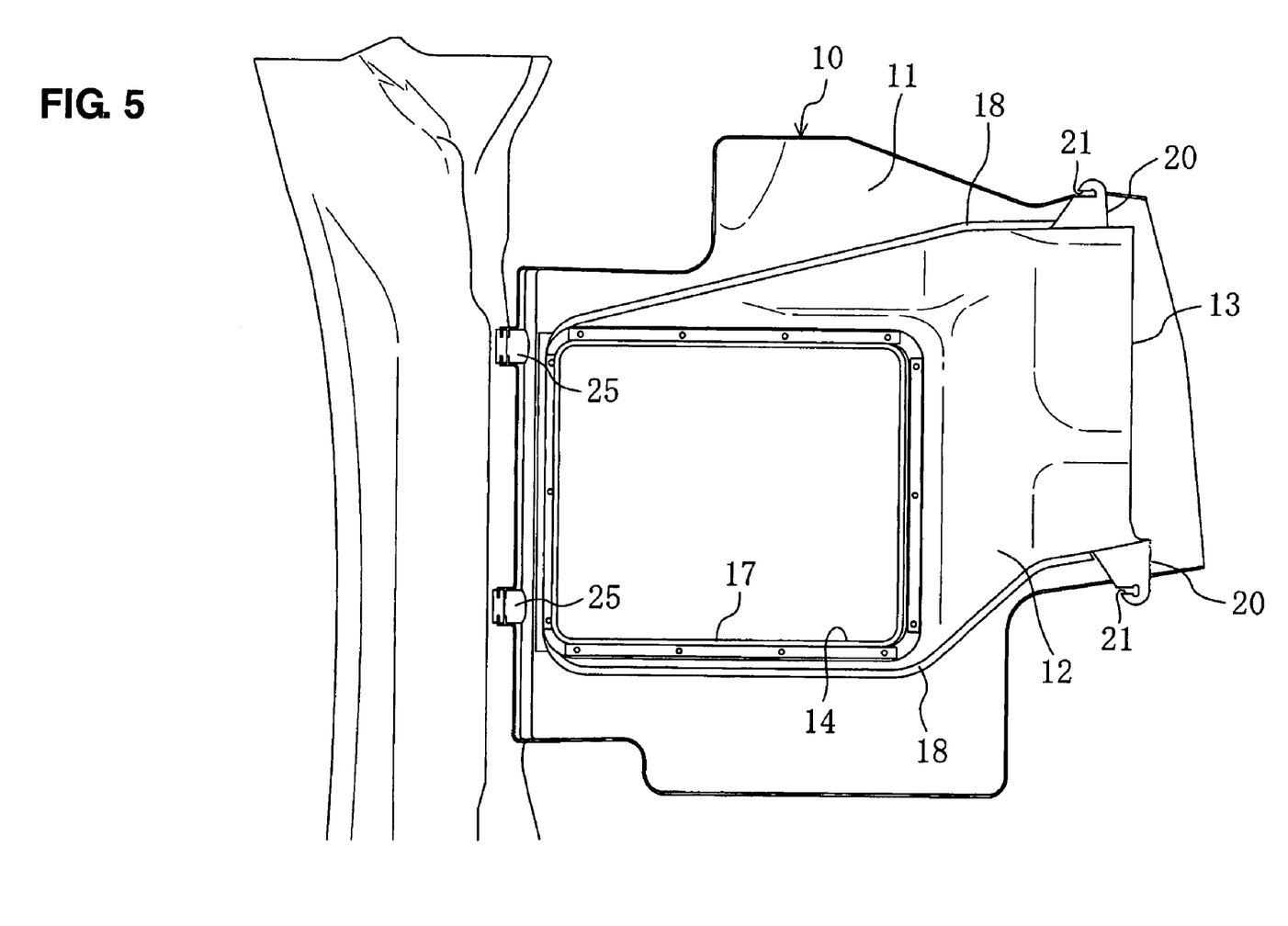
FIG. 5 is a plan view of the duct, viewed from below.
Figure 6:
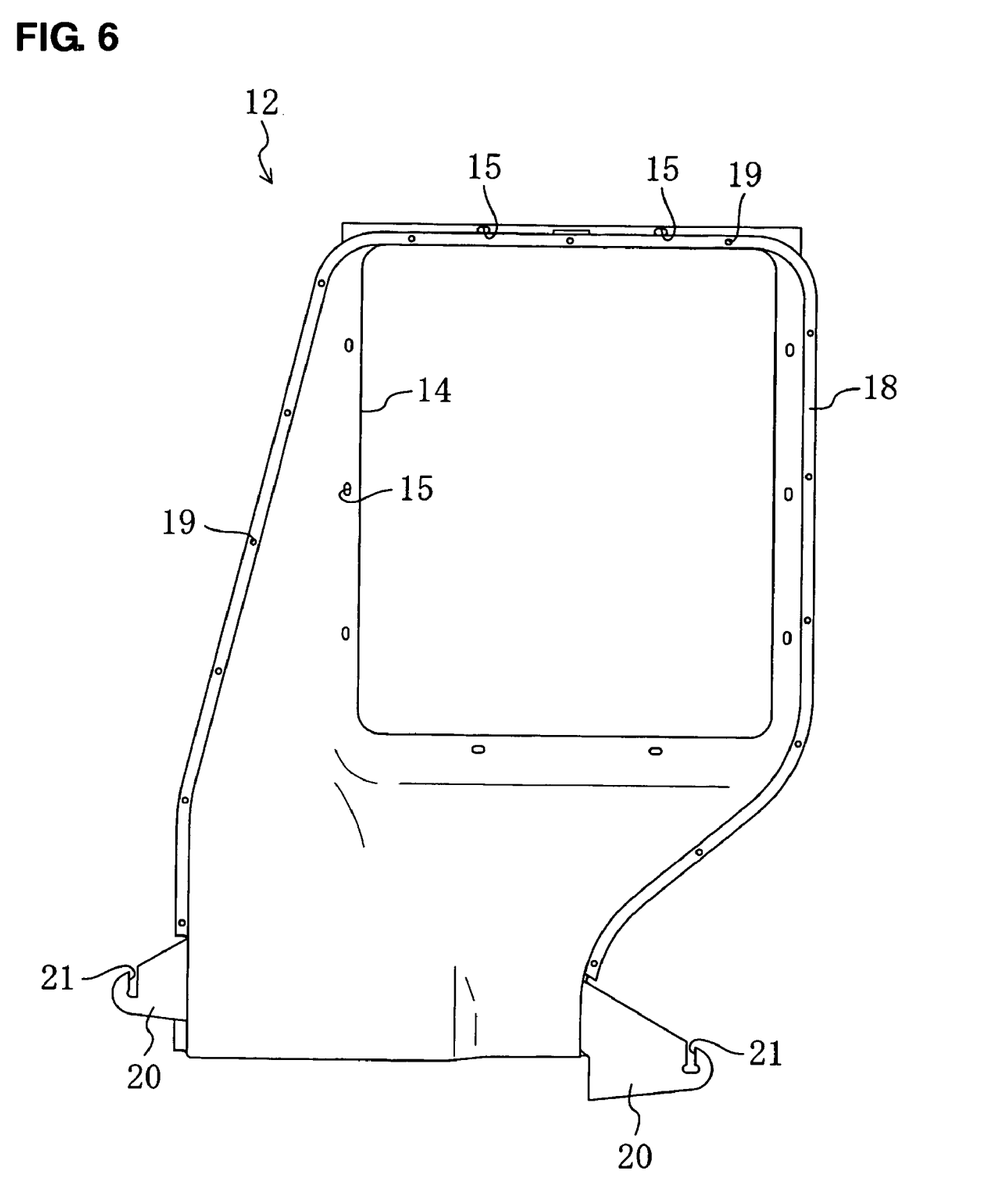
FIG. 6 is a plan view of a lower member, viewed from above.

As illustrated in FIGS. 5 and 6, the lower member 12 comprises a front opening, constituting a lower part of the inlet 13, and a lower opening 14 which is formed at its lower face at the rear. Around the lower opening 14 are provided a plurality of bolt-inserting holes 15, with which a bellows seal member 17 (see FIGS. 4 and 5) are attached. The lower opening 14 and the intercooler 2 are interconnected via the seal member 17 which is pressed against the upper face of the intercooler 2. Thus, the outside cooling air is taken in the duct 10 via the inlet 13, then the cooling air is supplied to the intercooler 2 via the air passage 40 in the duct 10.

At an upper edge portion of the lower member 12 is provided a flange 18 to attach the upper member 11 thereto. The flange 18 is formed at an almost entire periphery of the lower member 12, except a portion located at the above-described inlet 13, so as to extend substantially horizontally. The flange has a plurality of through holes 19 thereat which are formed at substantially regular intervals. Further, the lower member 12 comprises a pair of front support portions 20 which project outward on its front both sides. At the front support portions 20 are provided holes 21 to attach bolts 30, respectively. Its rear potion is formed in opening state, like a slit shape. Accordingly, at a vehicle frontal crash, the duct 10 is properly detached from a shroud panel 4, which is made of a fiber reinforced resin material, to cover a radiator 25 of the vehicle. Thereby, the shroud panel 4 is prevented from being deformed at the vehicle frontal crash.

Figure 7:
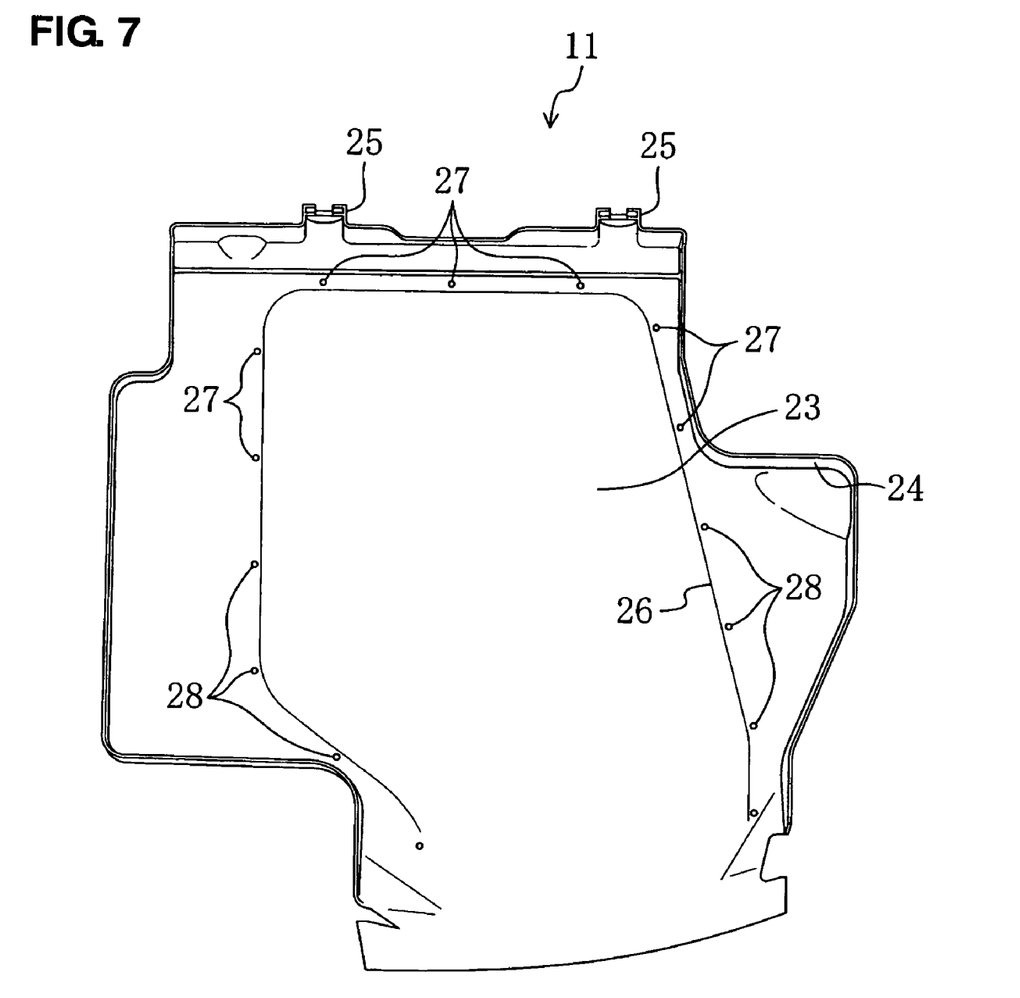
FIG. 7 is a plan view of an upper member, viewed from below.

The upper member 11, as illustrated in FIG. 7, includes a flat portion 23 and an outside wall portion 24 which projects downward from an almost entire periphery of the flat portion 23, except a portion located at the inlet 13 of the cooling air. The flat portion 23 has a larger area than the lower member 12 and covers the engine 1 almost entirely, thereby providing a good external appearance. At the rear of the outside wall portion 24 are provided two rear support portions 25 to attach the duct 10 which are in a half-cylindr cal shape. At the flat portion 23 of the upper member 11 is provided a projection 26 which projects downward corresponding to the outer periphery of the flange 18, so that positioning of the lower member 12 can be facilitated. Further, at the outer periphery of the projection 26 are provided pins 27, 28 which project downward corresponding to the through holes 19 formed at the flange 18.

Figure 8:
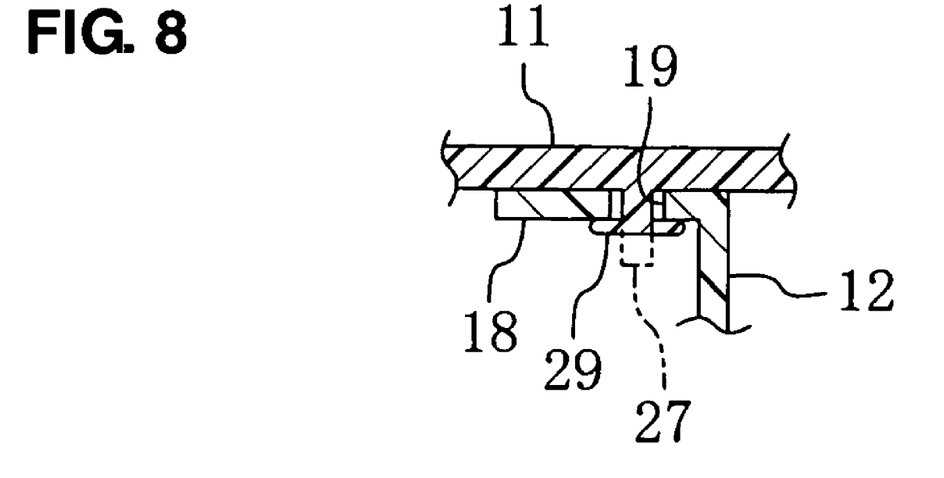
FIG. 8 is a sectional view illustrating a rear pin portion.
Figure 9:
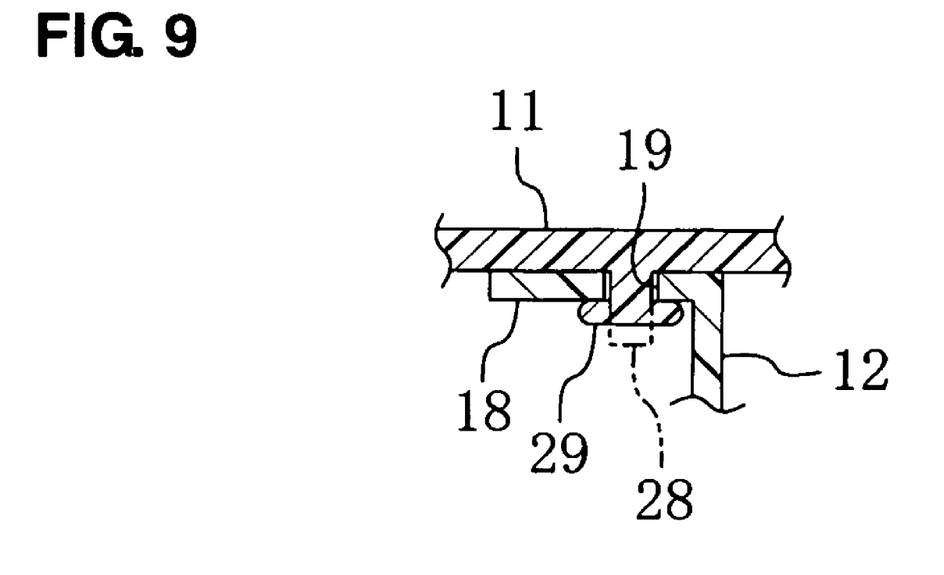
FIG. 9 is a sectional view illustrating a front pin portion.

As illustrated in FIGS. 8 and 9, the diameter size of the rear pins 27 (for example, pins located corresponding to a rear portion of the flange 18, and two front pins located at both sides of these pins) is smaller than that of the other front pins 28. Tips of the pins 27, 28 of the upper member 11 are inserted into the through holes 19 of the lower member 12 and then melted and pressed to be collapsed, resulting in enlarged head portions 29 formed at tip ends of the pins. Herein, since the diameter size of the rear pins 27 is smaller than that of the other front pins 28 and they are inserted into the same sized through holes 19, the rear pins 27 are come out or broken off from the through holes 19 more easily than the front pins 28 in the case where a crash load is applied. In this way, the upper member 11 and the lower member 12 are assembled integrally by being attached to each other in a substantially sealed state.

As illustrated in FIG. 1, the front support portions 20 of the lower member 12 are attached by the bolts 30, and thereby the duct 10 is supported at the shroud panel 4 at its front.

Figure 10:
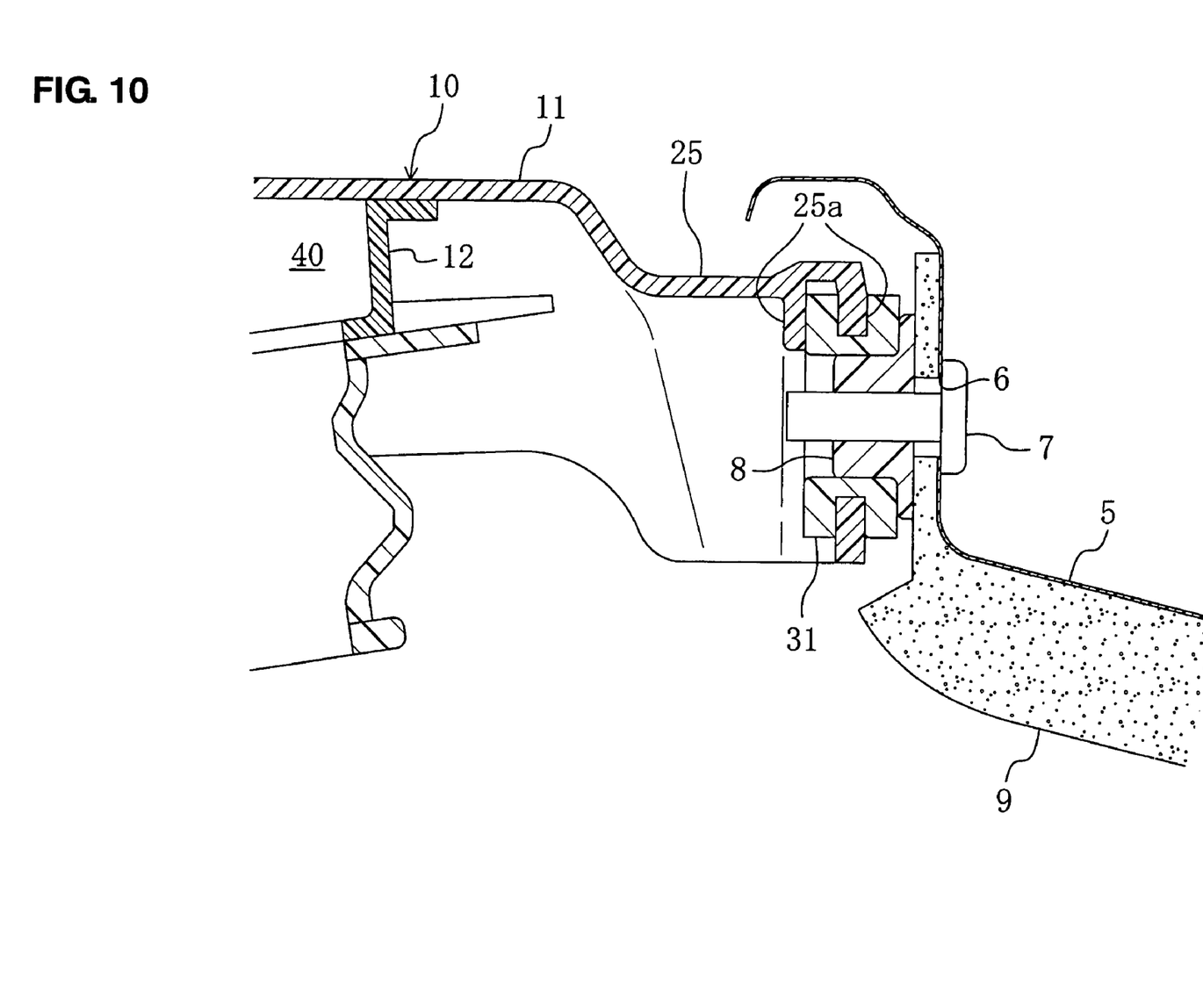
FIG. 10 is a sectional view illustrating a rear support portion.

Also, as illustrated in FIG. 10, a plurality of pin through holes 6 are formed at a cowl panel 5, and stud pins 7 are inserted into the pin through holes 6 from rear and then attached by projection welding. A heat-insulating material 9 is provided between the stud pins 7 and resin clips 8, thereby covering the front face of the cowl panel 5 with the heat-insulating material 9. Meanwhile, at the inner faces of the rear support portions 25 of the upper member 11 are provided double-ring engaging portions 25a. And, a rubber ring 31 having a ring body and a circular groove formed at the ring body is attached to each of the ring engaging portions 25a. The above-described resin clip 8 is pressed into the ring 31, thereby attaching the upper member 11 to the cowl panel 5.

Thus, the rear support portions 25 of the upper member 11 which is located at the rear portion of the duct 10 is supported at the cowl panel 5.

Herein, a rubber seal 32 extending in the vehicle width direction (see FIG. 2) is provided at a portion of the lower face of the engine hood 3 which is located above the cooling air intake inlet 13, thereby sealing a space between the upper member 11 and the engine hood 3. Further, in order to guide air coming in from a front grille 33 toward the inlet 13 of the duct 10, there is provided a guide plate 34 between the front grille 33 and the inlet 13.

Next, a process of attaching the duct 10 according to the present embodiment will be described.

First, the tips of the pins 27, 28 of the upper member 11 are inserted into the through holes 19 of the flange 18 of the lower member 12. In this state, the tips of the pins 27, 28 are melted and pressed to be collapsed, and thereby the enlarged head portions 29 are formed. Thus, the lower member 12 and the upper member 11 are attached to each other in the sealed state.

Next, the seal member 17 is attached to the bolt through holes 15 of the lower member 12. Meanwhile, the rubber rings 31 are fixed to the rear support portions 25.

Then, the resin clips 81 of the cowl panel 5 are inserted into the rings 31 of the rear support portions 25 of the upper member 11, pressing the seal member 17 attached to the duct 10 against the intercooler 2. Thereby, the rear of the upper member 11 is supported at the cowl panel 5.

Finally, the front support portions 20 of the lower member 12 are attached to the shroud panel 4. Thereby, the duct 10 is attached to the vehicle body.

Subsequently, an operation of the support structure of cooling air intake duct for intercooler of the vehicle according to the present embodiment at the time of the pedestrian hitting against the engine hood 3 will be described.

When the pedestrian has hit against the engine hood 3, the engine hood 3 is deformed downward, so that the duct 10 above the intercooler 2 is also about to be deformed downward.

Herein, in the present embodiment, the lower member 12 is supported at the shroud panel 4 at its front, while the upper member 11 is supported at the cowl panel 5 at its rear. The rear portion of the lower member 12 is just pressed against the seal member 17 placed on the intercooler 2. Therefore, the impact load of the pedestrian hitting against the engine hood 3 is transmitted to the duct 10 so as to function to bend the duct 10 supported at these front and rear support points.

And, the upper member 11 pushes the lower member 12, and thereby on the front attachment portion of the duct 10 between the upper and lower members 11, 12 acts a compressing load which is constituted of a downward force from the upper member 11 and an upward reaction force from the lower member 12.

Meanwhile, on the rear attachment point of the duct 10 acts a tension load which is constituted of an upward reaction force from the upper member 11 and a downward force from the lower member 12.

Further, since the diameter size of the rear pins 27 of the upper member 11 is smaller than that of the front pins 28, the rear pins 27 are broken earlier than the front pins 28 by the crash load applied to the engine hood 3, so that the duct 10 is split off, from the rear toward the front, into the upper member 11 and the lower member 12. Herein, the resin clips 8 are constituted so as not to come out of the rings 31 of the rear support portions 25 before the duct 10 has been split off.

According to the support structure of cooling air intake duct for intercooler of the vehicle of the present embodiment, since the duct 10 is supported at the vehicle body at the front support portion of the lower member 12 and at the rear support portion of the upper member 11, the rear attachment portion is detached earlier than the front attachment portion by the crash load applied to the engine hood 3 with the tension load applied to the rear attachment portion, so that the duct is split off from the rear. Accordingly, the duct 10 can be split surely and the engine hood 3 can be allowed to be properly deformed without being prevented, so that the protection of the head of pedestrians can be attained properly.

Also, according to the present embodiment, the front support portion of the lower member 12 is supported at the shroud panel 4 and the rear support portion of the upper member 11 is supported at the cowl panel 5, and thereby the duct 10 is split to the large extent over the engine hood 3 covering the intercooler 2 at the pedestrian's hit. Accordingly, the protection of the head of pedestrians can be attained surely.

Also, according to the present embodiment, the strength of the attachment on the rear side of the members 11, 12 is smaller than that of the attachment on the front side of the members, and thereby the detachment of the rear side is promoted. Accordingly, the protection of the head of pedestrians can be attained more effectively.

Further, according to the present embodiment, the pins 27, 28 of the upper member 11 are inserted into the through holes 19 of the lower member 12, and then their tips are melted and pressed to be collapsed to form the enlarged portions. The upper and lower members 11, 12 are fixed by these enlarged portions. Further, the diameter size of the rear pins 27 of the upper member 11 is smaller than that of the front pins 28. Accordingly, the members 11, 12 can be attached to each other in the properly sealing state with the simple structure. And, the duct 10 can be split off effectively from the rear pins 27 with the relatively small cross section at the pedestrian's hit. Thus, the protection of the head of pedestrians can be attained further surely.

The present invention should not be limited to the above-described embodiment, and the following embodiments can be also applied.

Figure 11:
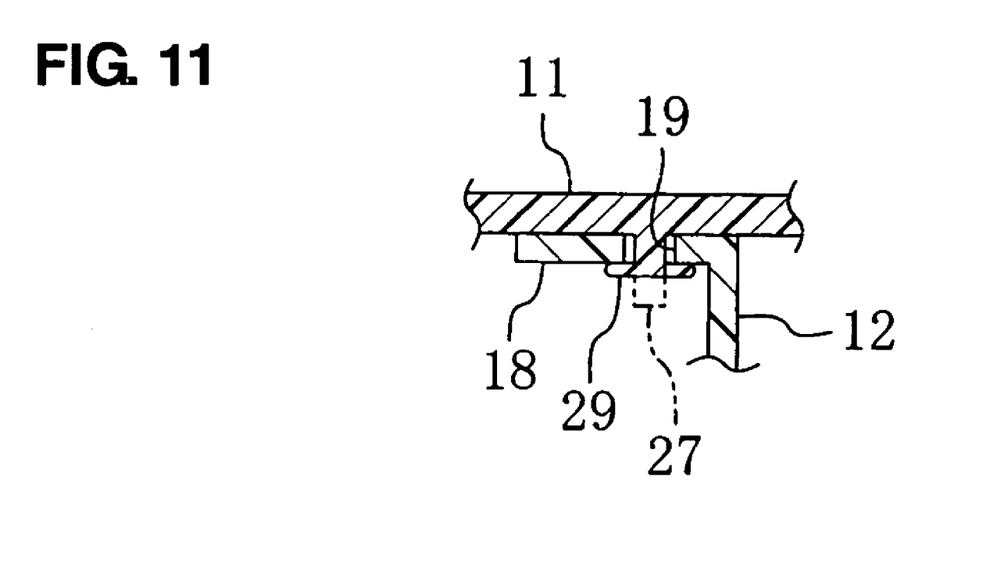
FIG. 11 is a view of another embodiment, which is equivalent to FIG. 8.
Figure 12:
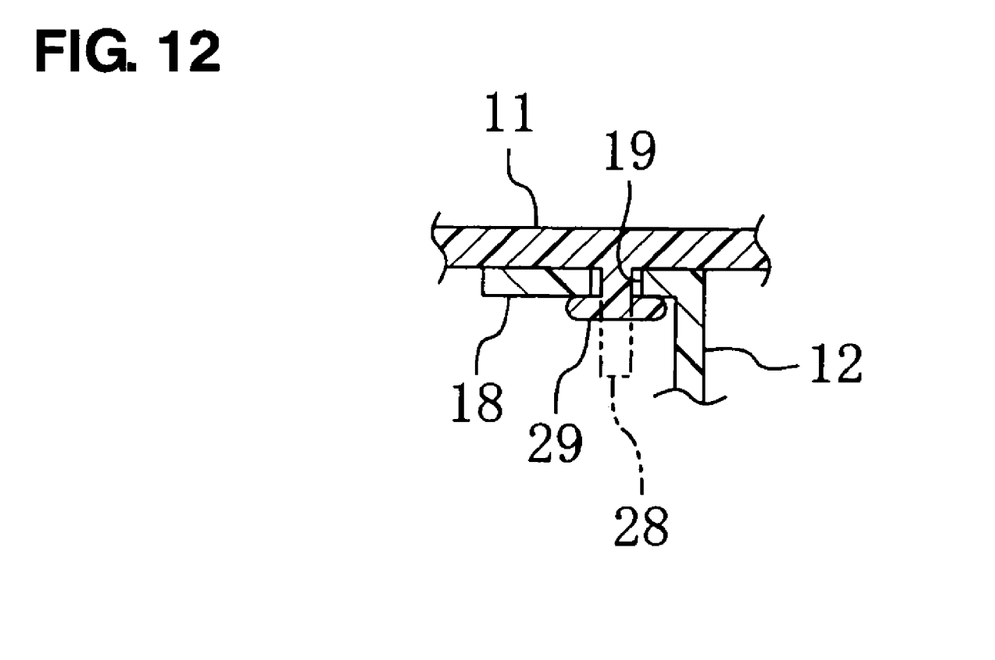
FIG. 12 is a view of another embodiment, which is equivalent to FIG. 9.

In the above-described embodiment, the diameter size of the rear pins 27 is smaller than that of the front pins 28, so that the strength of the attachment on the rear side of the members 11, 12 is smaller than that of the attachment on the front side of the members. However, as illustrated in FIGS. 11 and 12, the diameter size of the rear pins 27 may be the same as that of the front pins 28, and the length of the rear pins 27 may be shorter than that of the front pins 28. Thereby, the thickness of the enlarged head portions 29 of the rear pins 27 is thinner than that of the enlarged head portions 29 of the front pins 28, so that the strength of the attachment on the rear side of the members 11, 12 can be smaller than that of the attachment on the front side of the members. Also, the pins 27, 28 are provided at the upper member 11 formed at the substantially regular intervals. However, the interval of the rear pins 27 may be wider than that of the front pins 28 to a extent so that the sealing function of the attachment portion of the upper and lower members 11, 12 can be kept properly. Thereby, the strength of the attachment on the rear side of the members 11, 12 may be smaller than that of the attachment on the front side of the members.

Also, the front side of the lower member 12 is supported at the shroud panel 4 and the rear side of the upper member 11 is supported at the cowl panel 5 in the above-described embodiment. However, for example, a front support portion projecting upward may be provided on the front side of the lower member 12, and this front support portion may be support on the front side of the engine hood 3. Meanwhile, a rear support portion projecting upward may be provided on the rear side of the upper member 11, and this rear support portion may be supported on the rear side of the engine hood 3. Thus, when the engine hood 3 is closed, the seal member 17 may be pressed against the upper face of the intercooler 2. Also, the front side of the lower member 12 may be supported at the shroud panel 4, while the rear side of the upper member 11 may be supported at an attaching bracket with a mount which is provided at the engine so as to project upward. In this case, the duct 10 can be split off into the upper and lower members 11, 12 from the rear in the same manner as the above-described embodiment according to the deformation of the engine hood 3.

Also, the upper member 11 and the lower member 12 may be attached to each other by bonding the both directly or with an adhesive. In this case, the bonding point may be formed continuously or at intervals.

Also, the engine 1 may be disposed in the longitudinal direction of the vehicle.

Any other modifications and improvements can be applied within the scope of a sprit of the present invention.

What is claimed is:

1. A support structure of cooling air intake duct for intercooler of a vehicle, comprising:
   an intercooler disposed in a substantially flat position above an engine in an engine room which is covered by an engine hood; and
   a duct of cooling air intake for said intercooler, the duct extending below and separately from said engine hood toward the front of the vehicle,
   wherein said duct is made of resin and comprises an upper member and a lower member, which are formed separately and assembled integrally by being attached to one another, said lower member includes an opening which is formed at a lower face thereof at the rear, there is provided a seal member to interconnect the opening of said lower member and said intercooler, which is pressed against an upper face of said intercooler, and said duct is supported at a vehicle body at a front support portion, which is formed at said lower member thereof, and at a rear support portion, which is formed at said upper member thereof so that the upper member and the lower member of the duct are configured to be split off from each other from the rear support portion of the duct toward the front support portion of the duct when an impact load is applied to the engine hood from above.

2. The support structure of cooling air intake duct for intercooler of a vehicle of claim 1, wherein said duct includes an air passage which is formed therein in a laterally-long flat shape.

3. The support structure of cooling air intake duct for intercooler of a vehicle of claim 1, wherein said front support portion of the lower member is supported at a shroud panel of the vehicle, and said rear support portion of the upper member is supported at a cowl panel of the vehicle.

4. The support structure of cooling air intake duct for intercooler of a vehicle of claim 1, wherein the attachment of said upper member and said lower member is such that strength of the attachment on a rear side of said members is smaller than that of the attachment on a front side of said members.

5. A support structure of cooling air intake duct for intercooler of a vehicle, comprising:
   an intercooler disposed in a substantially flat position above an engine in an engine room; and
   a duct of cooling air intake for said intercooler, the duct extending toward the front of the vehicle,
   wherein said duct is made of resin and comprises an upper member and a lower member, which are formed separately and assembled integrally by being attached to one another, said lower member includes an opening which is formed at a lower face thereof at the rear, there is provided a seal member to interconnect the opening of said lower member and said intercooler, which is pressed against an upper face of said intercooler, and said duct is supported at a vehicle body at a front support portion, which is formed at said lower member thereof, and at a rear support portion, which is formed at said upper member thereof,
   the attachment of said upper member and said lower member is such that strength of the attachment on a rear side of said members is smaller than that of the attachment on a front side of said members, and
   the attachment of said upper member and said lower member comprises a plurality of pins which are provided at one of said members so as to project toward the other member, a plurality of through holes which are formed at the other member and into which said pins are inserted, and a plurality of enlarged head portions which are formed of tips of said pins which are melted and pressed to be collapsed after said pins have been inserted into said through holes, and said pins are constituted such that a diameter size of the pins located near said rear support portion is smaller than that of the pins located near said front support portion.

6. A support structure of cooling air intake duct for intercooler of a vehicle, comprising:
   an intercooler disposed in a substantially flat position above an engine in an engine room which is covered by an engine hood; and
   a duct of cooling air intake for said intercooler, the duct extending below and separately from said engine hood toward the front of the vehicle,
   wherein said duct is made of resin and comprises an upper member and a lower member, which are formed separately and assembled integrally by being attached to one another, said duct includes an air passage which is formed therein in a laterally-long flat shape, said lower member includes an opening which is formed at a lower face thereof at the rear, there is provided a seal member to interconnect the opening of said lower member and said intercooler, which is pressed against an upper face of said intercooler, and said duct is supported at a vehicle body at a front support portion which is formed at said lower member thereof and at a rear support portion which is formed at said upper member thereof so that the upper member and the lower member of the duct are configured to be split off from each other from the rear support portion of the duct toward the front support portion of the duct when an impact load is applied to the engine hood from above, the front support portion being supported at a shroud panel of the vehicle, the rear support portion being supported at a cowl panel of the vehicle.

* * * * *